(12) United States Patent
Phuyal et al.

(10) Patent No.: US 10,779,187 B2
(45) Date of Patent: Sep. 15, 2020

(54) UPLINK DATA REQUEST AND UPLINK SPLITTING SIGNALING

(71) Applicant: INTEL IP CORPORATION, Santa Clara, CA (US)

(72) Inventors: Umesh Phuyal, Beaverton, OR (US); Jerome Parron, Fuerth (DE); Alexander Sirotkin, Petach Tikva (IL); Candy Yiu, Portland, OR (US); Nageen Himayat, Fremont, CA (US); Ofer Hareuveni, Haifa (IL)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 16/094,819

(22) PCT Filed: Dec. 5, 2016

(86) PCT No.: PCT/US2016/065018
§ 371 (c)(1),
(2) Date: Oct. 18, 2018

(87) PCT Pub. No.: WO2017/192171
PCT Pub. Date: Nov. 9, 2017

(65) Prior Publication Data
US 2019/0124546 A1 Apr. 25, 2019

Related U.S. Application Data

(60) Provisional application No. 62/332,904, filed on May 6, 2016.

(51) Int. Cl.
H04W 28/02 (2009.01)
H04W 72/14 (2009.01)
(Continued)

(52) U.S. Cl.
CPC ... *H04W 28/0278* (2013.01); *H04W 72/1284* (2013.01); *H04W 72/14* (2013.01);
(Continued)

(58) Field of Classification Search
CPC ... H04W 28/04; H04W 72/04; H04W 72/042; H04W 88/08; H04L 5/0007
(Continued)

(56) References Cited

U.S. PATENT DOCUMENTS 9,042,320 B2 * 5/2015 Kim ........................ H04L 5/001
370/329
2010/0322156 A1 * 12/2010 Wu ........................ H04L 1/1867
370/329
(Continued)

FOREIGN PATENT DOCUMENTS

KR 10-2014-0118650 A 10/2014
WO 2013-186594 A1 12/2013

OTHER PUBLICATIONS

International Search Report and Written Opinion dated Mar. 16, 2017, on application No. PCT/US2016/065018.

*Primary Examiner* — Peter G Solinsky
*Assistant Examiner* — Sanjay K Dewan
(74) *Attorney, Agent, or Firm* — Alliance IP, LLC

(57) ABSTRACT

An apparatus of a base station includes a memory device and processing circuitry operatively coupled to the memory device. The processing circuitry processes a buffer status report (BSR) from a user equipment (UE) indicating an amount of data in a buffer of the UE. The processing circuitry further determines a ratio of WLAN uplink data to be transmitted on a WLAN channel of the UE to long term evolution (LTE) uplink data to be transmitted on a LTE channel. Furthermore, the processing circuitry encodes a
(Continued)

protocol data unit (PDU) indicating the amount, wherein the PDU is to be transmitted to the UE.

20 Claims, 9 Drawing Sheets

(51) Int. Cl.
*H04W 72/12* (2009.01)
*H04W 76/15* (2018.01)
*H04W 88/10* (2009.01)
*H04W 80/02* (2009.01)
*H04W 80/08* (2009.01)
*H04W 84/12* (2009.01)

(52) U.S. Cl.
CPC ........... *H04W 76/15* (2018.02); *H04W 88/10* (2013.01); *H04W 80/02* (2013.01); *H04W 80/08* (2013.01); *H04W 84/12* (2013.01)

(58) Field of Classification Search
USPC ......................................................... 370/329
See application file for complete search history.

(56) References Cited

U.S. PATENT DOCUMENTS

| | | | |
|---|---|---|---|
| 2012/0140743 A1* | 6/2012 | Pelletier ............ | H04W 72/0453 370/335 |
| 2014/0293970 A1* | 10/2014 | Damnjanovic ....... | H04L 5/0078 370/336 |
| 2015/0049678 A1* | 2/2015 | Speight ................. | H04W 72/00 370/329 |
| 2015/0181593 A1* | 6/2015 | Kim ...................... | H04W 24/02 370/329 |
| 2016/0050605 A1 | 2/2016 | Kim et al. | |
| 2016/0119939 A1* | 4/2016 | Himayat ........... | H04W 28/0278 370/329 |
| 2016/0157265 A1* | 6/2016 | Lee ................... | H04W 72/1284 370/329 |
| 2017/0367141 A1* | 12/2017 | Nagasaka ............. | H04W 76/16 |
| 2018/0124642 A1* | 5/2018 | Phuyal ................. | H04W 28/08 |

* cited by examiner

Oct 1

Oct 1
Oct 2

Oct 1

Oct 1
Oct 2

| D/C | PDU Type | DRBID | Oct 1 |
|---|---|---|---|
| WLAN UL Amount ||| Oct 2 |

FIG. 9

| D/C | PDU Type | R | Number of WUL requests | Oct 1 |
|---|---|---|---|---|
| DRBID #0 ||| WUL Amount #0 | Oct 2 |
| WUL Amount #0 | DRBID #1 ||| Oct 3 |
| WUL Amount #1 ||| DRBID #2 | Oct 4 |
| ... |||||
| WUL Amount #N ||| Padding | Oct M |

FIG. 10

| D/C | PDU Type | R | DRBID #0 || Oct 1 |
|---|---|---|---|---|---|
| DRBID #0 | WUL Amount #0 ||| E | Oct 2 |
| DRBID #1 |||| WUL Amount #1 | Oct 3 |
| WUL Amount #1 (cont.) | E ||| DRBID #2 | Oct 4 |
| ... ||||||
| WUL Amount #N |||| E | Padding | Oct M |

FIG. 11

| D/C | PDU Type | R | WLAN UL Ratio |

Oct 1

FIG. 12

| D/C | PDU Type | LCG ID | WLAN UL Ratio |

Oct 1

FIG. 13

| D/C | PDU Type | | DRBID | | Oct 1
| R | R | R | R | WLAN UL Ratio | Oct 2

FIG. 14

| D/C | PDU Type | R | R | R | R | R | Oct 1 |
|---|---|---|---|---|---|---|---|
| Buffer Size #0 | | | | | | Buffer Size #1 | Oct 2 |
| Buffer Size #1 | | | Buffer Size #2 | | | | Oct 3 |
| Buffer Size #2 | | Buffer Size #3 | | | | | Oct 4 |

FIG. 19

| D/C | PDU Type | DRBID | Oct 1 |
|---|---|---|---|
| R | R | Buffer Size | Oct 2 |

FIG. 20

| D/C | PDU Type | R | Number of BSRs | Oct 1 |
|---|---|---|---|---|
| DRBID #0 | | | Buffer Size #0 | Oct 2 |
| Buffer Size #0 | | DRBID #1 | | Oct 3 |
| Buffer Size #1 | | | DRBID #2 | Oct 4 |
| ... | | | | |
| Buffer Size #N | | | Padding | Oct M |

FIG. 21

UPLINK DATA REQUEST AND UPLINK SPLITTING SIGNALING

RELATED APPLICATION

This application claims the benefit under 35 U.S.C. § 119(e) of U.S. Provisional Application 62/332,904 filed on May 6, 2016, which is hereby incorporated by reference in its entirety.

BACKGROUND

The disclosure relates to the field of wireless communications, including wireless transmission of single tone signals.

BRIEF DESCRIPTION OF THE DRAWINGS

Various implementations of the present disclosure will be understood more fully from the detailed description given below and from the accompanying drawings of various implementations of the disclosure.

FIG. 9 illustrates an example protocol data unit used for signaling WLAN uplink data amount, according to an implementation.

FIG. 10 illustrates an example protocol data unit used for signaling WLAN uplink data amounts, according to an implementation.

FIG. 11 illustrates an example protocol data unit used for signaling WLAN uplink data amounts, according to an implementation.

FIG. 12 illustrates an example protocol data unit used for signaling WLAN uplink data ratio, according to an implementation.

FIG. 13 illustrates an example protocol data unit used for signaling WLAN uplink data ratio, according to an implementation.

FIG. 14 illustrates an example protocol data unit used for signaling WLAN uplink data ratio, according to an implementation.

FIG. 19 illustrates an example protocol data unit used for signaling buffer sizes, according to an implementation.

FIG. 20 illustrates an example protocol data unit used for signaling buffer size, according to an implementation.

FIG. 21 illustrates an example protocol data unit used for signaling buffer sizes, according to an implementation.

DETAILED DESCRIPTION

Figure 1:
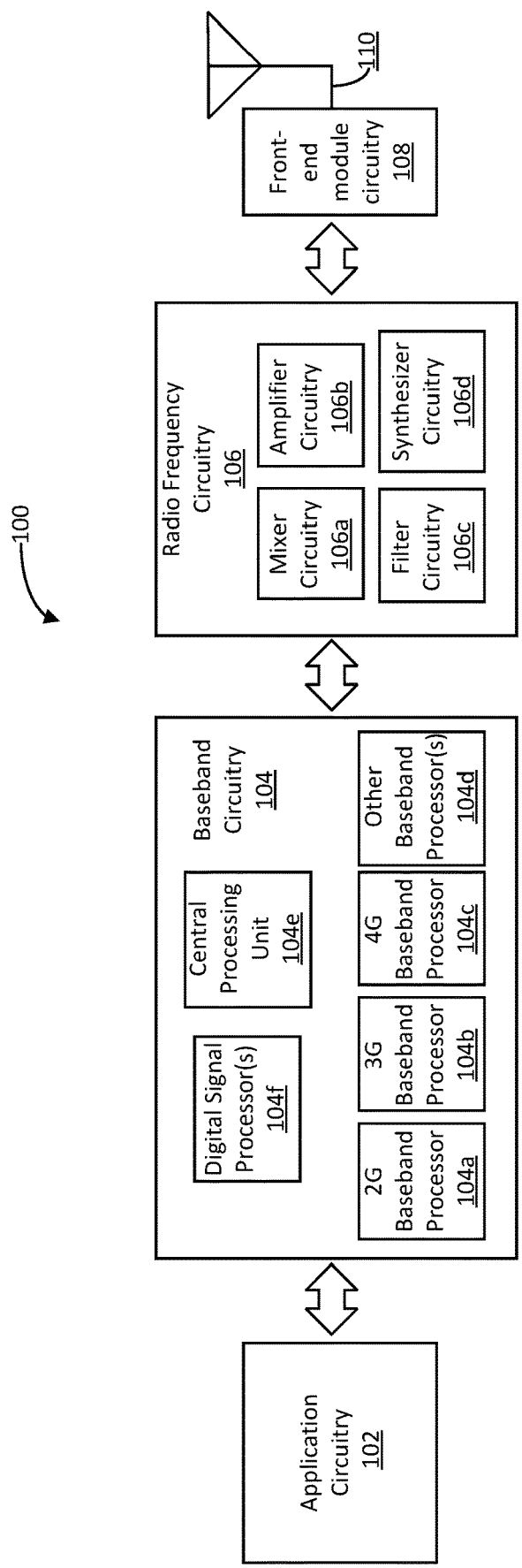
FIG. 1 is a block diagram illustrating components of an electronic device implementing aspects of the disclosure, according to an implementation.

Long term evolution (LTE) communication systems may be used in combination with wireless local area network (WLAN) communication systems to provide additional bandwidth or speed for communications between a user equipment (UE) and a network. The combination of LTE and WLAN communications is referred to as LTE-WLAN aggregation (LWA). In LWA communications, the spectrum used for LTE transmissions may be licensed to and controlled by an evolved NodeB (eNB) or a similar network node. However, the spectrum used for WLAN transmissions may not be controlled by the eNB. For example, other wireless devices may use the WLAN spectrum to transmit data at times and frequencies outside of the control of the eNB. Accordingly, communications over LTE spectrum may have a higher signal quality or throughput than those over WLAN spectrum. In order to improve LWA communications, an eNB may determine an amount of uplink (UL) data that a UE should transmit over a WLAN channel and an LTE channel.

The amount of data to send over the WLAN channel may be expressed as a set amount (for example, a number of bits of data), a ratio of data to send over the WLAN channel compared to the LTE channel, or the like. In order to determine the amount of uplink data to be sent by the UE to send over an LTE or WLAN channel, the eNB may use information from the UE regarding the amount and/or type of data that the UE has to send. The UE may provide such information in a buffer status report (BSR). The BSR may indicate the total amount of data to be sent on both LTE and WLAN channels, the amount of data to send on LTE or WLAN channels separately, or the amount of data to be sent on LWA bearers.

After receiving the BSR from a UE, the eNB may determine an amount of UL data that is to be sent on WLAN channels and LTE channels. In some embodiments, the eNB may make a determination based on the BSRs received in view of an estimated throughput for the LTE and WLAN channels. For example, the eNB may estimate the throughput for the LTE and WLAN channels based on throughput reporting from the UE or based on other mechanisms such as modulation and coding schemes (MCS) used for transmissions to or from the UE. In conjunction with a BSR indicating the amount and type of data the UE has to send, the eNB may use the estimated throughputs to determine a ratio of traffic that the UE is to send over the WLAN channel. The ratio may be expressed as a percentage of data for the UE to send on the WLAN channel, an amount of data to send on the WLAN channel, or in another manner. Additionally and optionally, the ratio may be used by the UE to determine an amount of data to send over LTE and WLAN channels over a time window specified by the eNB.

In some embodiments, after the eNB determines the amount of data to be transmitted on corresponding links, it allocates the uplink grants on the LTE channel and controls the amount of data to be sent on the WLAN channel. The amount of data to be sent on the WLAN channel may be controlled by signaling the determined ratio to the UE along with a time window during which that ratio should be used or maintained. The eNB may signal the ratio and time window to the UE over the WLAN channel using LWA adaptation protocol (LWAAP), in-band signaling over the LTE channel using a media access control (MAC) control element (MAC CE), over LTE or WLAN channels using packet data convergence protocol (PDCP) control protocol data unit (PDU), radio resource control (RRC) signaling, or the like. The UE may then maintain the determined ratio over the time window selected and signaled by the eNB.

In some embodiments, the eNB may specify an amount of data to transmit over the WLAN channel. The eNB may signal the amount of data to send in terms of a number of bytes to send. The number of bytes may be indicated using LWA adaptation protocol, in-band signaling over the LTE channel using a MAC CE, over LTE or WLAN channels using a PDCP control PDU, RRC signaling, or the like. Example implementations of signaling mechanisms are described further below.

In some embodiments, the communications from the eNB to the UE may indicate an amount of data to transmit over a WLAN channel as a ratio of data to send over the WLAN channel compared to the LTE channel. The eNB may signal the ratio of data to send in terms of a percentage of total data that is transmitted by the UE. The ratio may be indicated using LWA adaptation protocol, in-band signaling over the LTE channel using a MAC CE, over LTE or WLAN channels using a PDCP control PDU, RRC signaling, or the like. Example implementations of signaling mechanisms are described further below.

In some embodiments, the eNB may signal to the UE a time window. The UE may follow the indication of an amount of WLAN data to transmit during the time window. For example, the time window may indicate an amount of time during which a set amount of bytes should be sent over a WLAN channel by the UE. The time window may also be used to determine a time during which a WLAN/LTE transmission ratio should be maintained by the UE. In some embodiments, the time window may be a sent to the UE during signaling of an amount of data to send over the WLAN channel. In some embodiments the time window may be set by the eNB for all UEs connected to the eNB, or the time window may be set individually for particular UEs. For example, the time window may be set based on mobility states or other states of the UE. In some embodiments, a UE may use a default time window unless a specific different time window is set by the eNB. In some embodiments, the eNB may signal a time window for a UE over a separate message. The eNB may signal the time window to the UE using LWA adaptation protocol, in-band signaling over the LTE channel using a MAC CE, over LTE or WLAN channels using a PDCP control PDU, RRC signaling, or the like. Example implementations of signaling mechanisms are described further below.

In some embodiments, the BSR may be associated with LWA bearers or non-LWA bearers. For example, the UE may send BSR information regarding LWA bearers using a particular logical channel group (LCG). Accordingly, the eNB may determine which BSR information references LWA bearers based on the LCG identification (LCG ID) included in the BSR. In some embodiments, a different BSR may be used for LWA bearers and non-LWA bearers. For example, a BSR including information for LWA bearers may be provided to the eNB using LWAAP over a WLAN channel and other BSRs including information for non-LWA bearers may be provided over an LTE channel. In some embodiments, the UE may provide BSR information for particular data radio bearers (DRBs). For example, individual BSRs may be sent for each DRB having uplink data to send or a single BSR may include BSR information for each DRB having uplink data to send. The BSRs may be sent from the UE to the eNB using LWA adaptation protocol, in-band signaling over the LTE channel using a MAC CE, over LTE or WLAN channels using a PDCP control PDU, RRC signaling, or the like. Example implementations of signaling mechanisms are described further below.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of the claimed disclosure. However, various aspects of the disclosed embodiments may be practiced in other examples that depart from these specific details. In certain instances, descriptions of well-known devices, circuits, and methods are omitted so as not to obscure the description of the present disclosure with unnecessary detail.

As used herein, the term "circuitry" may refer to, be part of, or include an Application Specific Integrated Circuit (ASIC), an electronic circuit, a processors (shared, dedicated, or group), and/or memory device (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Embodiments described herein may be implemented into a system using any suitably configured hardware and/or software. FIG. 1 illustrates, for one embodiment, example components of a User Equipment (UE) device 100. The system shown described with reference to FIG. 1, may also be used as components of an eNB, or may be an eNB In some embodiments, the UE device 100 may include application circuitry 102, baseband circuitry 104, Radio Frequency (RF) circuitry 106, front-end module (FEM) circuitry 108 and one or more antennas 110, coupled together at least as shown.

The application circuitry 102 may include one or more application processors. For example, the application circuitry 102 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

The baseband circuitry 104 may include circuitry such as, but not limited to, one or more single-core or multi-core processors. The baseband circuitry 104 may include one or more baseband processors and/or control logic to process baseband signals received from a receive signal path of the RF circuitry 106 and to generate baseband signals for a transmit signal path of the RF circuitry 106. Baseband processing circuitry 104 may interface with the application circuitry 102 for generation and processing of the baseband signals and for controlling operations of the RF circuitry 106. For example, in some embodiments, the baseband circuitry 104 may include a second generation (2G) baseband processor 104a, third generation (3G) baseband processor 104b, fourth generation (4G) baseband processor 104c, and/or other baseband processor(s) 104d for other existing generations, generations in development or to be developed in the future (e.g., fifth generation (5G), 6G, etc.). Other baseband processors 104d may also include WLAN baseband processors to encode and decode messages over a WLAN channel. The baseband circuitry 104 (e.g., one or more of baseband processors 104a-d) may handle various radio control functions that enable communication with one or more radio networks via the RF circuitry 106. The radio control functions may include, but are not limited to, signal modulation/demodulation, encoding/decoding, radio frequency shifting, etc. In some embodiments, modulation/demodulation circuitry of the baseband circuitry 104 may include Fast-Fourier Transform (FFT), preceding, and/or constellation mapping/demapping functionality. In some embodiments, encoding/decoding circuitry of the baseband circuitry 104 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 104 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 104e of the baseband circuitry 104 may be configured to run elements of the protocol stack for signaling of the PHY, MAC, RLC, PDCP and/or RRC layers. In some embodiments, the baseband circuitry may include one or more audio digital signal processor(s) (DSP) 104f. The audio DSP(s) 104f may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 104 and the application circuitry 102 may be implemented together such as, for example, on a system on a chip (SOC).

In some embodiments, the baseband circuitry 104 may provide for communication compatible with one or more radio technologies. For example, in some embodiments, the baseband circuitry 104 may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry 104 is configured to support radio communications of more than one wireless protocol may be referred to as multi-mode baseband circuitry.

In some embodiments, the baseband circuitry 104 may operate to encode or decode WLAN and LTE transmissions. For example, the baseband circuitry 104 may use encode and decode messages over LWA communications. The baseband circuitry 104 may determine whether to use an LWA bearer based on instructions sent by an eNB. In some embodiments, the baseband circuitry 104 may determine how much uplink data is to be sent over WLAN channel or over an LTE channel. The baseband circuitry 104 may determine how much uplink data to send over a particular channel based on signaling received from an eNB.

RF circuitry 106 may enable communication with wireless networks using modulated electromagnetic radiation through a non-solid medium. In various embodiments, the RF circuitry 106 may include switches, filters, amplifiers, etc. to facilitate the communication with the wireless network. RF circuitry 106 may include a receive signal path which may include circuitry to down-convert RF signals received from the FEM circuitry 108 and provide baseband signals to the baseband circuitry 104. RF circuitry 106 may also include a transmit signal path which may include circuitry to up-convert baseband signals provided by the baseband circuitry 104 and provide RF output signals to the FEM circuitry 108 for transmission.

In some embodiments, the RF circuitry 106 may include a receive signal path and a transmit signal path. The receive signal path of the RF circuitry 106 may include mixer circuitry 106a, amplifier circuitry 106b and filter circuitry 106c. The transmit signal path of the RF circuitry 106 may include filter circuitry 106c and mixer circuitry 106a. RF circuitry 106 may also include synthesizer circuitry 106d for synthesizing a frequency for use by the mixer circuitry 106a of the receive signal path and the transmit signal path. In some embodiments, the mixer circuitry 106a of the receive signal path may be configured to down-convert RF signals received from the FEM circuitry 108 based on the synthesized frequency provided by synthesizer circuitry 106d. The amplifier circuitry 106b may be configured to amplify the down-converted signals and the filter circuitry 106c may be a low-pass filter (LPF) or band-pass filter (BPF) configured to remove unwanted signals from the down-converted signals to generate output baseband signals. Output baseband signals may be provided to the baseband circuitry 104 for further processing. In some embodiments, the output baseband signals may be zero-frequency baseband signals, although this is not a requirement. In some embodiments, mixer circuitry 106a of the receive signal path may comprise passive mixers, although the scope of the embodiments is not limited in this respect.

In some embodiments, the mixer circuitry 106a of the transmit signal path may be configured to up-convert input baseband signals based on the synthesized frequency provided by the synthesizer circuitry 106d to generate RF output signals for the FEM circuitry 108. The baseband signals may be provided by the baseband circuitry 104 and may be filtered by filter circuitry 106c. The filter circuitry 106c may include a low-pass filter (LPF), although the scope of the embodiments is not limited in this respect.

In some embodiments, the mixer circuitry 106a of the receive signal path and the mixer circuitry 106a of the transmit signal path may include two or more mixers and may be arranged for quadrature downconversion and/or upconversion respectively. In some embodiments, the mixer circuitry 106a of the receive signal path and the mixer circuitry 106a of the transmit signal path may include two or more mixers and may be arranged for image rejection (e.g., Hartley image rejection). In some embodiments, the mixer circuitry 106a of the receive signal path and the mixer circuitry 106a may be arranged for direct downconversion and/or direct upconversion, respectively. In some embodiments, the mixer circuitry 106a of the receive signal path and the mixer circuitry 106a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 106 may include analog-to-digital converter (ADC) and digital-to-analog converter (DAC) circuitry and the baseband circuitry 104 may include a digital baseband interface to communicate with the RF circuitry 106. In some dual-mode embodiments, a separate radio IC circuitry may be provided for processing signals for WLAN and LTE channels separately, although the scope of the embodiments is not limited in this respect.

In some embodiments, the synthesizer circuitry 106d may be a fractional-N synthesizer or a fractional N/N+1 synthesizer, although the scope of the embodiments is not limited in this respect as other types of frequency synthesizers may be suitable. For example, synthesizer circuitry 106d may be a delta-sigma synthesizer, a frequency multiplier, or a synthesizer comprising a phase-locked loop with a frequency divider.

The synthesizer circuitry 106d may be configured to synthesize an output frequency for use by the mixer circuitry 106a of the RF circuitry 106 based on a frequency input and a divider control input. In some embodiments, the synthesizer circuitry 106d may be a fractional N/N+1 synthesizer.

In some embodiments, frequency input may be provided by a voltage controlled oscillator (VCO), although that is not a requirement. Divider control input may be provided by either the baseband circuitry 104 or the applications processor 102 depending on the desired output frequency. In some embodiments, a divider control input (e.g., N) may be determined from a look-up table based on a channel indicated by the applications processor 102.

Synthesizer circuitry 106d of the RF circuitry 106 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into $N_d$ equal packets of phase, where $N_d$ is the number of delay elements in the delay line. In this way, the DLL provides negative feedback to help ensure that the total delay through the delay line is one VCO cycle.

In some embodiments, synthesizer circuitry 106d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency ($f_{LO}$). In some embodiments, the RF circuitry 106 may include an IQ/polar converter.

FEM circuitry 108 may include a receive signal path which may include circuitry configured to operate on RF signals received from one or more antennas 110, amplify the received signals and provide the amplified versions of the received signals to the RF circuitry 106 for further processing. FEM circuitry 108 may also include a transmit signal path which may include circuitry configured to amplify signals for transmission provided by the RF circuitry 106 for transmission by one or more of the one or more antennas 110.

In some embodiments, the FEM circuitry 108 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 106). The transmit signal path of the FEM circuitry 108 may include a power amplifier (PA) to amplify input RF signals (e.g., provided by RF circuitry 106), and one or more filters to generate RF signals for subsequent transmission (e.g., by one or more of the one or more antennas 110.

In some embodiments, the UE device 100 may include additional elements such as, for example, memory/storage, display, camera, sensor, and/or input/output (I/O) interface.

Figure 2:
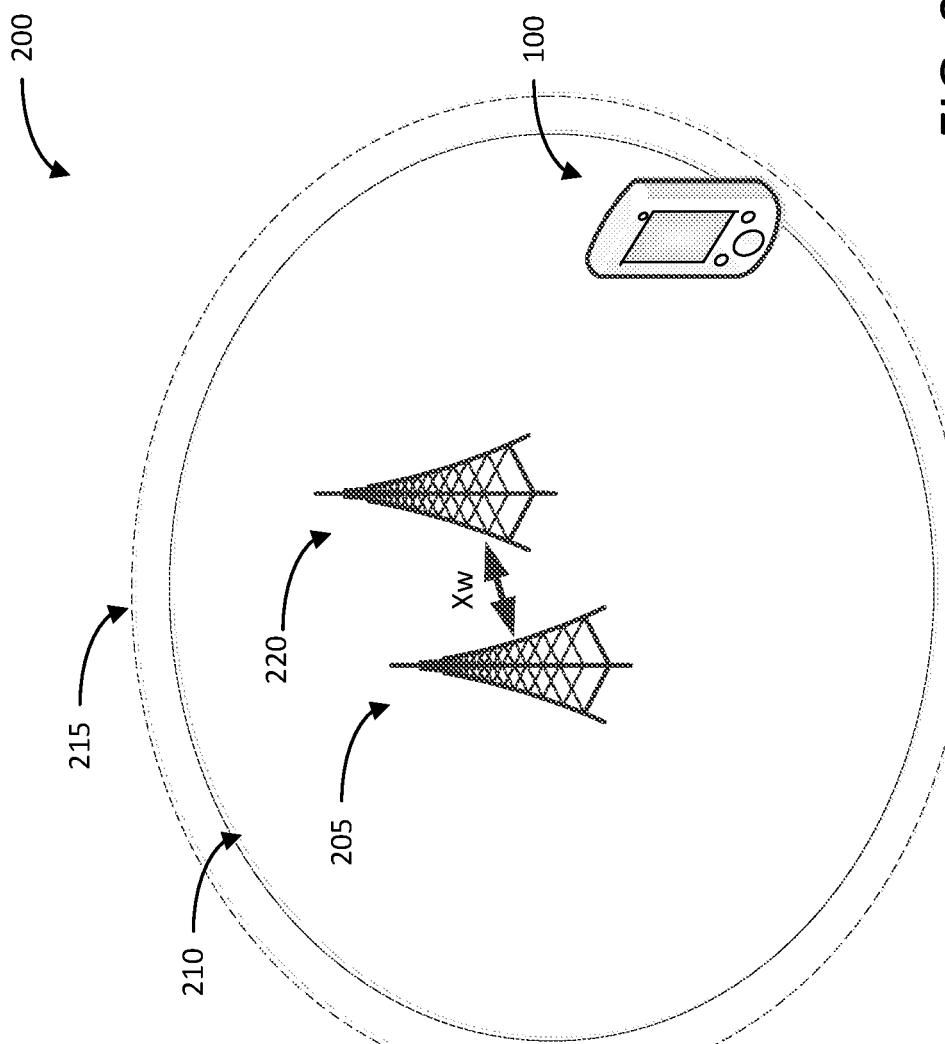
FIG. 2 is a block diagram illustrating components of a network environment, according to an implementation.

FIG. 2 depicts an example network environment 200 having a UE 100, a WLAN AP 220, and an eNB 205. As shown in FIG. 2, the UE may be in a range to receive or transmit uplink or downlink data to eNB 205. In some embodiments, the UE may be a UE as described with reference to FIG. 1 above. In some embodiments, the eNB may be as described with reference to FIG. 3 below or FIG. 1 above. In some embodiment the eNB 205 may be connected to an EPC to provide network services to the UE 100. The eNB 205 may have a primary serving cell 210 and a secondary serving cell 215. The primary serving cell 210 may be used for LTE transmissions to and from the UE. The secondary serving cell 215 may be used for WLAN transmissions to and from the UE. The secondary serving cell may be served by a separate WLAN AP 220. The eNB 205 may use the primary and secondary serving cells 210, 215 with carrier aggregation to improve throughput of uplink or downlink data for the network. The eNB 205 and the AP 220 may be connected via Xw interface to perform the aggregation of the WLAN and LTE to support a LWA bearer for use by the UE. In some embodiments, the eNB may provide additional secondary serving cells. In some embodiments, the eNB 205 and AP 220 may be implemented in a single node or may be collocated. Furthermore, the eNB 205 and AP 220 may be connected by another interface.

In some embodiments, the primary serving cell 210 may provide all of the control signaling to the UE for configuring logical channels of the UE 100 and to provide uplink grants to the UE. The communications between the primary serving cell 210 and the UE 100 may be performed over an LTE channel. Accordingly, the scheduled time and frequencies for use by the UE 100 may be set by the eNB 205 to ensure QoS for the UE by reducing interference from other sources.

In some embodiments, the secondary serving cell 215 may be used for WLAN transmission. For example, the eNB 205 may not have an exclusive license to the time or frequencies used by the secondary serving cell 215. Accordingly, there may be transmissions producing interference on the secondary serving cell 215 that are out of control of the eNB 205. Therefore, the UE 100 may have a lower QoS when sending communications on the secondary serving cell 215. However, using the secondary serving cell for some network communications may improve the available bandwidth for transmission. For example, uplink data transmission with lower required QoS may be transmitted over the unlicensed secondary serving cell 215. The eNB 205 may estimate the throughput on the primary serving cell 210 and secondary serving cell 215 to determine how much data is to be sent using a WLAN channel and how much data is to be sent using an LTE channel for LWA. The eNB 205 may also use one or more BSRs provided to the eNB 205 from the UE 100 to determine how much data is to be sent by the UE over each channel.

After determining how much data is to be sent over each channel, the eNB 205 may provide an indication of the amount of data to be sent over a WLAN channel using LWA adaptation protocol, in-band signaling over the LTE channel using a MAC CE, over LTE or WLAN channels using a PDCP control PDU, RRC signaling, or the like. Although described herein as providing an indication of an amount of data to be sent over a WLAN channel, in some embodiments, the amount of data may be instead described with reference to the amount of data to be sent over an LTE channel. After receiving one or more uplink grants from the eNB 205 and an indication of how much WLAN data to transmit, the UE may use the uplink grants to transmit uplink data to the eNB 205 using LWA according to the data ratio specified by the eNB 205.

Figure 3:
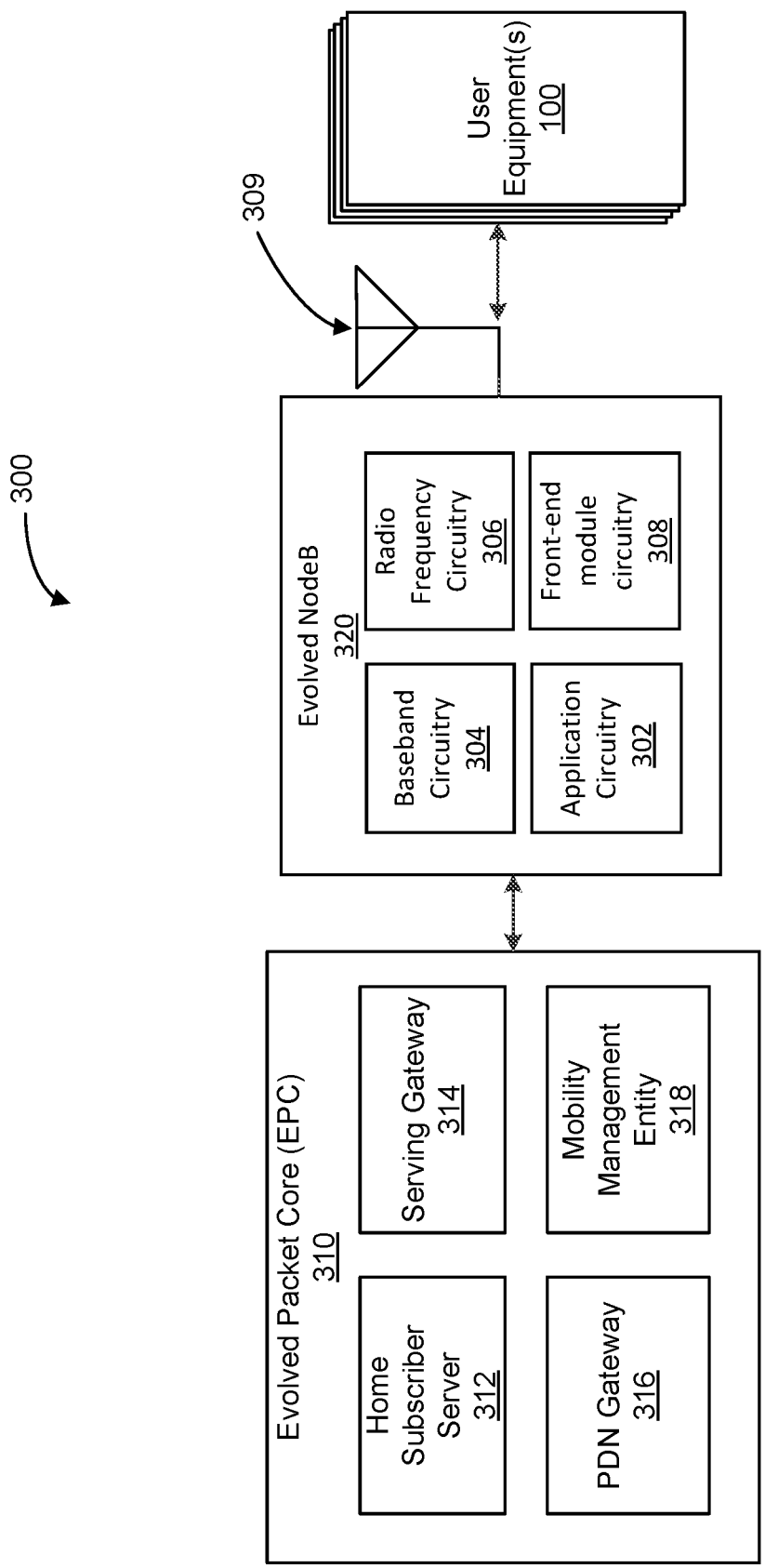
FIG. 3 is a block diagram illustrating components of a network environment implementing aspects of the disclosure, according to an implementation.

FIG. 3 illustrates additional components of a network environment 200. For example, the network environment 200 may be similar or the same as that discussed with reference to FIG. 2 above. In FIG. 3, the network environment 300 includes an evolved packet core (EPC) 310, an eNB 320, and a plurality of UEs 100. The eNB 320 may be similar to the eNB 205 discussed with reference to FIG. 2 above. For example, the eNB 320 may transmit and receive communications from one or more UEs 100 over a primary and secondary serving cell. The UEs 100 may be as described above with reference to FIG. 1.

The EPC in FIG. 3 may include a serving gateway 314, a packet data network (PDN) gateway 316, a mobility management entity (MME) 318, and a home subscriber server (HHS) 312. The HHS 312 may include a database that supports MME functionality. For example, the HHS 312 may include information on user and subscriber information for authentication and access authorization. For example, the HHS 312 may include information for a subscriber accessing a network through a UE 100.

The eNodeB 320 may provide signaling in the control plane for the UE. For example, the eNodeB 320 may determine whether to provide an uplink grant to a UE. The eNodeB 320 may also provide configuration messages to the UE. For example, the eNB may provide control signaling to the UE using LWA adaptation protocol, in-band signaling over the LTE channel using a MAC CE, over LTE or WLAN channels using a PDCP control PDU, RRC signaling, or the like. The eNodeB 320 may also decode messages received from the UE, such as BSRs. The eNodeB 320 may use BSRs from the UE and an estimate of throughput on WLAN and LTE channels to determine how much data to send over a WLAN channel.

The serving gateway 314 and the PDN gateway 316 may provide a gateway for connections from the UEs 100 to a network. For example, the serving gateway 314 may provide signaling to maintain connections between the UEs 100 and the EPC 310. The serving gateway 213 may route uplink and downlink packets from the EPC 310 to the UE 100 through the eNB 320. The PDN gateway 316 may provide connection from the EPC 310 to a wider network. For example, the PDN gateway 316 may provide a connection from the EPC 310 to the internet, a wide area network, a local area network, or the like. The PDN gateway 316 may route packets to and from various PDNs to the UEs 100 through the serving gateway 314. In some embodiments, the serving gateway 314 and the PDN gateway 316 may be a single component of the EPC 310. In addition to the components of the EPC 310 illustrated in FIG. 3, the EPC 310 may include additional components. For example, the EPC 310 may include additional components to support additional access technologies. The components of the EPC 310 may include one or more processors or associated memory devices to carry out various features or functions.

The EPC 310 may be associated with one or more eNB 320 to transmit and receive signals from UEs 100. For example, the EPC 310 and eNB 320 may communicate over an ×2 interface such that signals may be transmitted and received at the EPC 310 from the UE 100. In some embodiments, another wired or wireless interface between the EPC 310 and the eNB 320 may be used.

The eNB 320 may include application circuitry 302, baseband circuitry 304, radio frequency (RF) circuitry 306, front-end module (FEM) circuitry 308, and one or more antenna 309. The components of the eNB 320 may perform operations similar to the corresponding components of the UE 100 described above. For example, the RF circuitry 306 may provide signals to FEM circuitry 308 to cause the antenna 309 to transmit wireless signals to the UE. For example, RF circuitry 306 may include similar components to those described with reference to the UE in FIG. 1 above. For example, the RF circuitry 306 may include mixer circuitry, amplifier circuitry, filter circuitry, or synthesizer circuitry. The eNB may also include one or more antennas 309 with which to transmit and receive signals. Likewise, the baseband circuitry 304 may include a similar set of baseband processors as describe above with reference to baseband circuitry of UE 100. For example, the baseband circuitry 304 may include baseband processors to enable communications over WLAN and LTE channels. Furthermore, the application circuitry 302 may execute a variety of applications for the eNB 320. In some embodiments, the eNB 320 may also include additional components not shown. In some embodiments, the eNB may provide multiple serving cells to the UE 100 such as is described above with reference to FIG. 2. Some of the serving cells provide access through a WLAN channel and some may provide access through an LTE channel. The eNB may use LWA to increase throughput available to the network.

Based on network configuration settings at the eNB, that may be partially or fully set by the EPC 310, the eNB may provide an uplink grant to the UE 100 in response to a request from the UE 100. For example, the UE 100 may provide a BSR to the eNB 320 indicating uplink data to be transmitted to the network. The eNB may use the information in the BSR to determine how much data is to be sent by the UE over WLAN and LTE channels.

Figure 4:
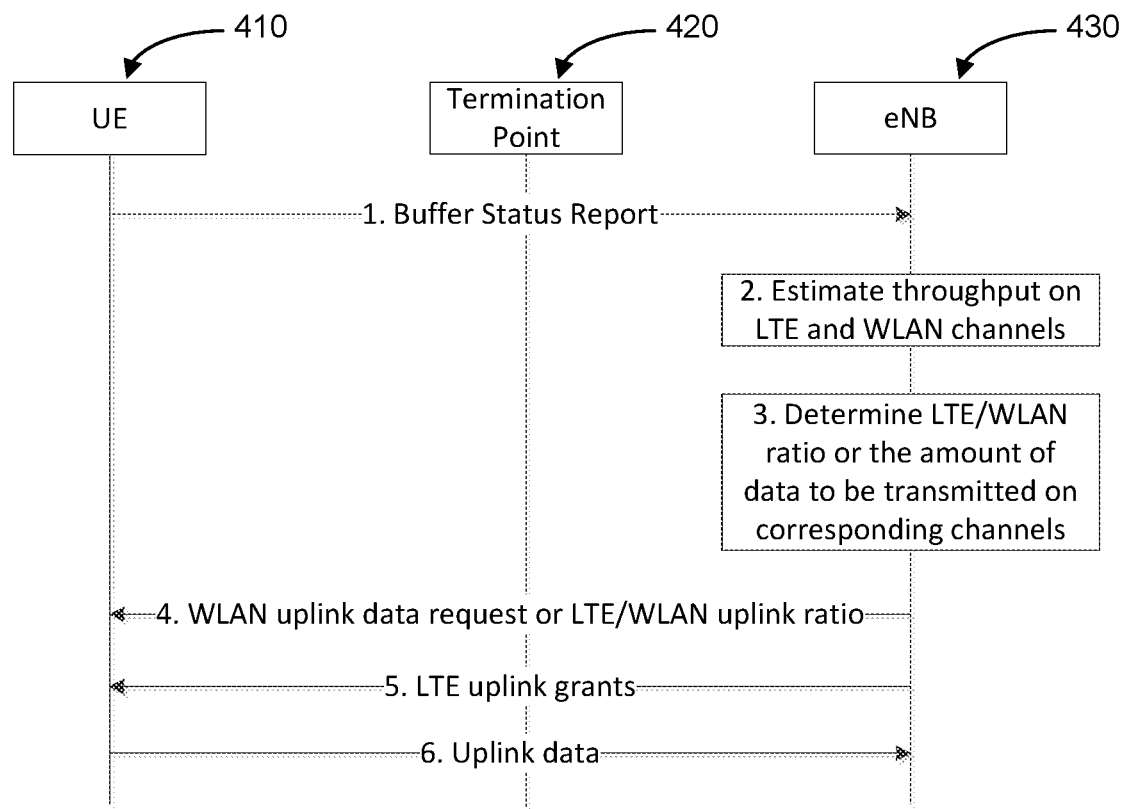
FIG. 4 is a flow diagram illustrating different steps of communications between the nodes in a network environment, according to an implementation.

FIG. 4 illustrates a diagram showing operations performed by a UE and an eNB to establish a WLAN/LTE ratio for LWA communications. The diagram includes communications between the UE 410 and an eNB 430 passed through a termination point 420. The termination point 420 may be a wireless access point or other node, such as a WLAN Termination (WT), at which a WLAN channel or LTE channel from the UE 410 to the eNB 430 is terminated.

Accordingly, the termination point 420 may perform operations of an interface between a WLAN channel and the eNB 430. In some embodiments, one or more of the messages shown in FIG. 4 may be sent between the UE and the eNB on an LTE channel, and the termination point 420 may be an LTE termination point. The UE 410 may be similar or the same as that described above with reference to FIG. 1. The eNB 430 may be similar or the same as that described above with reference to FIG. 3.

Beginning with operation 1, the UE provides the eNB 430 with a BSR. In some embodiments, the UE 410 may transmit more than one BSR to the eNB 430 to provide details regarding various LCGs. In some embodiments, the UE 410 may transmit more than one BSR to the eNB 430 to provide details regarding various logical channels (LCIDs) or DRBs. The BSR provided by operation 1 may indicate a buffer size for uplink data to be transmitted using LWA. In some embodiments, the UE 410 may send the BSR to the eNB 430 over an LTE channel rather than over a WLAN channel. For example, the UE 410 may send the BSR to the eNB 430 using LWAAP, in-band signaling over an LTE channel using a MAC CE, over LTE or WLAN channels using a PDCP control PDU, or the like.

After receiving the BSR from the UE, the eNB 430 may estimate throughput on LTE and WLAN channels in operation 2. The throughput may be estimated based on a received signal strength indicator, based on modulation and coding schemes, based on interference on frequencies used by the LTE channels, interference on frequencies used by WLAN channels, or a combination of the above, or based on other information provided by the UE 410 or measured by the eNB 430.

In operation 3, the eNB 430 may use the estimated throughputs for the LTE and WLAN channels and the BSR provided by the UE 410 to determine an LTE/WLAN ratio or the amount of data to be transmitted on corresponding channels. The eNB can determine such amount or ratio periodically based on various criteria such as on a regular interval, after a certain traffic volume has been transmitted, or the like. The eNB 430 may then adjust the ratio as necessary. For example, the eNB 430 may determine a ratio to maximize the throughput of data over a set amount of time for the UE 410 based on the throughput of each channel. In some embodiments, the eNB 430 may set the LTE/WLAN ratio to balance the required quality of service for the data in the BSR with the expected throughput of the LWA channel. For example, the eNB 430 may set the ratio such that enough data is transmitted over the LTE component of an LWA channel to guarantee a quality of service, while offloading some data to the WLAN component to reduce the LTE resources dedicated to the UE 410. In some embodiments, other techniques may be used to determine an amount or a ratio of data to transmit on the LTE or WLAN channels.

In operation 4, the eNB 430 transmits a WLAN uplink data request or a LTE/WLAN uplink ratio. The WLAN uplink data request may specify an amount of data (e.g., represented in bits, bytes, or a range of bits or bytes) for the UE 410 to transmit over the WLAN channel. The LTE/WLAN uplink ratio may specify a ratio of WLAN uplink data that is to be transmitted by the UE 410 compared to the amount of LTE data that is transmitted by the UE 410. In some embodiments, the LTE/WLAN uplink ratio may specify a ratio of WLAN uplink data that is to be transmitted by the UE 410 compared to the total amount of data that is transmitted by the UE 410. In some embodiments, the WLAN uplink data request or the LTE/WLAN uplink ratio may further specify a time window during which the data request or ratio should be used. For example, a WLAN uplink data request sent to the UE 410 may include an indication of an amount of time within which of the requested amount of data is to be sent. Similarly, a LTE/WLAN uplink ratio sent to the UE 410 may include an indication of an amount of time during which the ratio is to be followed by the UE 410. In some embodiments, the eNB 430 may send the data request or ratio to the UE 410 over a WLAN channel. In some embodiments, the eNB 430 may send the data request or ratio to the UE 410 over an LTE channel rather than over a WLAN channel. For example, the eNB 430 may send the data request or ratio to the UE 410 using LWAAP, in-band signaling over an LTE channel using a MAC CE, over LTE or WLAN channels using a PDCP control PDU, or the like.

In operation 5, the eNB 430 may provide one or more LTE uplink grants to the UE 410. The uplink grants may include an indication of frequency and time resources allocated to the UE 410 to transmit uplink data over an LTE channel. The eNB 430 may provide the LTE uplink grants to the UE 410 based on various criteria such as pre-configured periodic scheduling (e.g., SPS), dynamic generated dedicated LTE grants using physical downlink control channel (PDCCH) signaling which may be based on the reported BSR, scheduling request or on a random access response (RAR) message in case of random access channel (RACH) procedure. In some embodiments, the eNB 430 may also provide an indication about upcoming LTE uplink grants to the UE 410 instead of the actual uplink grants. In some embodiments, the eNB 430 may send the indication about upcoming LTE uplink grants to the UE 410 over a WLAN channel. In some embodiments, the eNB 430 may send the indication about upcoming LTE uplink grants to the UE 410 over an LTE channel rather than over a WLAN channel. For example, the eNB 430 may send the uplink grants to the UE 410 using LWAAP, in-band signaling over an LTE channel using a MAC CE, over LTE or WLAN channels using a PDCP control PDU, or the like.

In operation 6, the UE 410 transmits uplink data to the eNB 430. For example, the UE 410 may transmit uplink data over an LTE channel at a time and frequency indicated by the LTE uplink grants received by the UE 410. The UE 410 may also transmit uplink data over a WLAN channel. In some embodiments, the UE 410 may transmit uplink data over a WLAN channel at times when the UE 410 is not transmitting uplink data over an LTE channel. In some embodiments, the UE 410 may transmit uplink data over a WLAN channel and an LTE channel at the same time. The UE 410 may determine how much data to transmit over a WLAN channel based on the WLAN uplink data request or the LTE/WLAN uplink ratio provided by the eNB 430. For example, the UE 410 may transmit WLAN data until an amount of data transmitted over the WLAN channel is the same as that indicated in the WLAN uplink data request. In some embodiments, the UE 410 may treat the amount as a maximum, a minimum, or a range of an amount of WLAN uplink data to transmit. In some embodiments, the UE 410 may spread the amount of WLAN data indicated by the uplink data request evenly over a timing window. For example, the UE 410 may use a timing window specified by eNB 430 or a timing window in the UE's settings. If the UE 410 received an LTE/WLAN uplink ratio, the UE 410 may determine an amount of WLAN data to transmit over a WLAN channel based on the amount of data that has already been sent over an LTE channel. For example, if the UE transmits a first amount of data over an LTE channel, the UE may determine a second amount of data to transmit over the WLAN channel such that the ratio is satisfied. In some embodiments, the UE 410 may determine an amount of WLAN data to transmit over a WLAN channel based on an amount of data that is estimated to be sent over an LTE channel. For example, the UE may estimate that a first amount of data will be transmitted over an LTE channel and UE determine a second amount of data to transmit over the WLAN channel such that the ratio is satisfied.

FIGS. 5-21 show example implementations of data structures for use with communications as described above with reference to FIGS. 1-4. The data structures are represented as PDUs. Each PDU may include one or more octets, each containing 8 bits. In FIGS. 5-21, the octets are labeled with "Oct" and a reference number. Furthermore, the data structures shown in FIGS. 5-21 may include one or more reserved bits that are indicated with an "R." The reserved bits may be used as padding such that the PDUs fit into an octet, or reserved for potential signaling in later iterations of the specifications.

FIGS. 5-11 described below are example implementations of signaling from an eNB to a UE to indicate a WLAN uplink data request using LWAAP control PDU. In some embodiments, similar implementations may be used for signaling from an eNB to a UE to indicate a WLAN uplink data request using MAC CE or PDCP control PDU or the like. For example, the example PDUs shown in FIGS. 5-11 may be sent in operation 4 of the diagram illustrated in FIG. 4.

Figure 5:
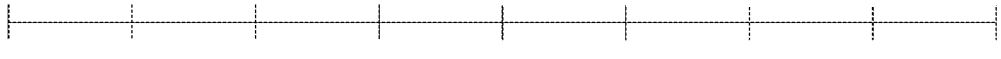
FIG. 5 illustrates an example protocol data unit used for signaling WLAN uplink data amount, according to an implementation.

FIG. 5 is an example LWAAP PDU to indicate an amount of WLAN uplink data to transmit. The D/C field may be used to differentiate LWAAP data vs control PDU. Because the first bit in a specification of a LWAAP data PDU is a reserved bit, in this example for backward compatibility a value of D/C=0 may indicate that the PDU is a data PDU and 1 may mean the PDU is a control PDU. In some embodiments the values can be defined such that D/C=1 indicates a data PDU and 0 indicates a control PDU. The PDU type field may indicate the type of information carried in this PDU. For example, the 2 bits may indicate a type of PDU as a data request, a reserved bit, or as another type of PDU. In other examples, the PDU type field may include fewer or additional bits to indicate different number of types of PDUs.

The WLAN uplink data request may indicate an amount of data to transmit on the WLAN link. In the example, the PDU includes a 5 bit field, which can indicate up to 32 different values. In some embodiments, the PDU may include fewer or additional bits to indicate a different granularity of uplink data to transmit. An example table below shows a mapping of the value of this field and the amount of data to be sent on WLAN UL. The example table below is based on 1500 bytes for an IP packet. In some embodiments, other size IP packets may have different ranges for uplink data.

| Index | Data to be sent on WLAN |
| --- | --- |
| 0 | WUL = 0 |
| 1 | 0 < WUL <= 1500 |
| 2 | 1500 < WUL <= 3000 |
| 3 | 3000 < WUL <= 4500 |
| 4 | 4500 < WUL <= 6000 |
| 5 | 6000 < WUL <= 7500 |
| 6 | 7500 < WUL <= 9000 |
| 7 | 900 < WUL <= 10500 |
| 8 | 10500 < WUL <= 12000 |
| 9 | 12000 < WUL <= 13500 |
| 10 | 13500 < WUL <= 15000 |
| 11 | 15000 < WUL <= 16500 |
| 12 | 16500 < WUL <= 18000 |
| 13 | 18000 < WUL <= 19500 |
| 14 | 19500 < WUL <= 21000 |
| 15 | 21000 < WUL <= 22500 |
| 16 | 22500 < WUL <= 24000 |
| 17 | 24000 < WUL <= 25500 |
| 18 | 25500 < WUL <= 27000 |
| 19 | 27000 < WUL <= 28500 |
| 20 | 28500 < WUL <= 30000 |
| 21 | 30000 < WUL <= 31500 |
| 22 | 31500 < WUL <= 33000 |
| 23 | 33000 < WUL <= 34500 |
| 24 | 34500 < WUL <= 36000 |
| 25 | 36000 < WUL <= 37500 |
| 26 | 37500 < WUL <= 39000 |
| 27 | 39000 < WUL <= 40500 |
| 28 | 40500 < WUL <= 42000 |
| 29 | 42000 < WUL <= 43500 |
| 30 | 43500 < WUL <= 45000 |
| 31 | 45000 < WUL <= ∞ |

Figure 6:
FIG. 6 illustrates an example protocol data unit used for signaling WLAN uplink data amount, according to an implementation.

FIG. 6 is an example of an LWAAP PDU to indicate an amount of WLAN uplink data to transmit. The fields shown in FIG. 6 may be similar to those described with FIG. 5, however, the WLAN uplink amount field is shown with additional bits to provide higher granularity. In some embodiments, the PDU types may be defined as short or long WLAN UL amount PDUs by the PDU type field. For example, the PDU types may be identified by the table below.

| Bit | Description |
| --- | --- |
| 00 | WLAN UL amount (short) |
| 01 | WLAN UL amount (long) |
| 10-11 | Reserved |

In the examples shown in FIGS. 5 and 6, the WLAN UL data request from the eNB may be provided on a per UE basis. In some embodiments, uplink resources may also be provided within an LCG and applied to different DRBs of same priority by the UE. In some embodiments, the eNB may use a prioritized bit rate in LWAAP for prioritization of LWA DRBs. For example, after WLAN uplink data request is received, for each DRB with a guaranteed bit rate, a bandwidth per time period may be reserved to provide a guaranteed bit rate for the DRB, and the rest can be shared for other DRBs. For instance, for a switched LWA bearer providing 100% of uplink traffic on WLAN, if there is one guaranteed bit rate for a DRB with reserved bandwidth of 100 kB/s and WLAN uplink data requests are received with a time interval of 10 ms, then 10 kB can be reserved for the guaranteed bit rate DRB, and the rest amount could be for other DRBs. Additionally, the information about the WLAN uplink amount may be helpful for the UE on a per LCG basis or on per DRB or LCID basis.

Figure 7:
FIG. 7 illustrates an example protocol data unit used for signaling WLAN uplink data amount, according to an implementation.
Figure 8:
FIG. 8 illustrates an example protocol data unit used for signaling WLAN uplink data amount, according to an implementation.

FIG. 7 is an example of an LWAAP PDU to indicate an amount of WLAN uplink data to transmit for a specified LCG ID. The fields shown in FIG. 7 may be similar to those described with reference to FIGS. 5 and 6 above. However, the example PDU in FIG. 7 may include an additional field to indicate an LCG ID. FIG. 8 may also include a long version of the example shown in FIG. 7. The PDU type field may indicate whether the PDU is a long version or a short version of a PDU indicating an amount of WLAN uplink data to transmit for a particular LCG ID. FIG. 9 may be similar to the PDU examples shown and described with respect to FIGS. 7 and 8, however, the particular data to send on the uplink may be indicated according to a DRB ID rather than according to an LCG ID.

When the number of DRBs is large, the signalling overhead of signalling WLAN data request message per DRB using the format in FIG. 9 may be large. In such scneario, a format may be used that is capable of signalling multiple WLAN uplink data request on per DRB basis using single message to reduce the overall transmission overhead. Accordingly, an additional field indicating the number of WLAN uplink requests included in the PDU may be provided as shown in FIG. 10. In various embodiments, the field sizes for different fields shown in FIG. 10 may be different than shown in the FIG. 10.

In the PDU format shown in FIG. 10, the number of WLAN uplink requests field indicates the number of DRB specific WLAN uplink amounts included in the PDU. In some embodiments, the PDU example shown in FIG. 10 may include padding bits for byte-alignment. In some embodiments, the PDU formats of FIGS. 9 and 10 may be distinguished using different PDU types indicated in the PDU. In some embodiments, extension bits may be added to infer the number of WLAN uplink requests included in the PDU instead of including number of WLAN uplink requests field. For example, as shown in FIG. 11, the PDU may have an extension bit after each WLAN uplink amount field wherein E=1 may indicate that there is an additional WLAN uplink amount after the previously provided WLAN uplink amount and E=0 may indicate that no more WLAN uplink amount fields are present.

FIGS. 12-14 described below are example implementations of signaling from an eNB to a UE using LWAAP control PDU to indicate a ratio of data to transmit over a WLAN channel. In some embodiments, similar implementations may be used for signaling from an eNB to a UE to indicate a ratio using MAC CE or PDCP control PDU or the like. For example, the example PDUs shown in FIGS. 12-14 may be sent in operation 4 of the diagram illustrated in FIG. 4.

FIG. 12 is an example LWAAP PDU to indicate a ratio of WLAN uplink data to transmit. The D/C field may be used to indicate whether the PDU is LWAAP data vs control PDU as discussed above. Because the first bit in a specification of a LWAAP data PDU is a reserved bit, in this example for backward compatibility to other LWAAP PDUs may be maintained by setting a value of D/C=0 to indicate that the PDU is a data PDU and a value of D/C=1 to indicate that the PDU is a control PDU. In some embodiments the values can be defined such that D/C=1 indicates a data PDU and 0 indicates a control PDU. This PDU type field may indicate the type of information carried in this PDU. For example, the 2 bits may indicate a type of PDU as a data request, a reserved bit, or as another type of PDU. In other examples, the PDU type field may include fewer or additional bits to indicate different number of types of PDUs.

The eNB indicates the percentage of traffic to be carried on the WLAN using a WLAN uplink ratio field in the LWAAP PDU example shown in FIG. 12. The remaining amount of data will be sent in uplink by using LTE uplink grants. In some embodiments, the percentage may be indicated as a percentage to send on an LTE link instead of on a WLAN link. In such cases, the PDU may include an LTE uplink ratio instead of an LTE uplink ratio. In some embodiments, the percentage may indicate a ratio of traffic to send on a WLAN link relative to the amount of data to be sent on the LTE link.

The WLAN uplink ratio field shown in FIG. 12 may indicate how a percentage of data from an uplink buffer for the UE to attempt to transmit on the WLAN link. In the example, the WLAN uplink ratio may be a 4 bit number to indicate 16 values of WLAN uplink ratios. An example table below shows a mapping of the value of WLAN uplink ratio field to a percentage of data to be transmitted on WLAN UL. In some embodiments, other values may be used in the table, or the percentage values may have a different level of granularity based on the size of the WLAN uplink ratio field.

| Index | Ratio of Data to be sent on WLAN UL (RW) [percentage] |
|---|---|
| 0 | RW = 0 |
| 1 | 5 |
| 2 | 10 |
| 3 | 20 |
| 4 | 25 |
| 5 | 30 |
| 6 | 40 |
| 7 | 50 |
| 8 | 60 |
| 9 | 70 |
| 10 | 75 |
| 11 | 80 |
| 12 | 85 |
| 13 | 90 |
| 14 | 95 |
| 15 | 100 |

A UE may use the indicated uplink ratio to determine how much WLAN data to transmit. In some embodiments, the UE may approximate the ratio indicated by the WLAN UL ratio. For example, it may not be possible to obtain exact split ratio as signaled due to granularity of the packet size (e.g., each IP packet may be about 1500 bytes). Therefore the signaled ratio may be used as an indication of a target ratio with a margin of error. For example, when split ratio is signaled as 50%, the actual splitting by the UE may be in the range of 50±5%. In some embodiments, the range may be set at a different margin.

FIGS. 13 and 14 depict additional examples of PDUs indicating a ratio of uplink buffer data to transmit by a UE. FIG. 13 includes a WLAN uplink ratio field with an LCG ID field to indicate the ratio of uplink data to send on a WLAN link for a specified LCG ID. FIG. 14 includes a WLAN uplink ratio field with a DRB ID field to indicate the ratio of uplink data to send on a WLAN link for a specified DRB ID.

Figure 15:
FIG. 15 illustrates an example protocol data unit used for signaling WLAN uplink data ratio and time window, according to an implementation.
Figure 16:
FIG. 16 illustrates an example protocol data unit used for signaling WLAN uplink data ratio and time window, according to an implementation.
Figure 17:
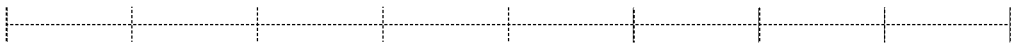
FIG. 17 illustrates an example protocol data unit used for signaling WLAN uplink data ratio and time window, according to an implementation.

FIGS. 15-17 described below are example implementations of signaling from an eNB to a UE using LWAAP control PDU to indicate a ratio of data to transmit over a WLAN channel and a time window to follow the ratio. In some embodiments, similar implementations may be used for signaling from an eNB to a UE to indicate a ratio using MAC CE or PDCP control PDU or the like. For example, the example PDUs shown in FIGS. 15-17 may be sent in operation 4 of the diagram illustrated in FIG. 4.

FIG. 15 depicts an example PDU with D/C, PDU type, and WLAN uplink ratio fields as discussed above. The PDU in FIG. 15 also includes a time window field. Because the eNB may not be able to control the timing of uplink data transmission over a WLAN link, it may not be clear to the UE the time period during which the UE should send the uplink data corresponding to WLAN uplink data request or maintain the splitting ratio signaled from the network.

Therefore, the WLAN UL data request and UL split ratio can be associated to a time window. Although the example PDU shown in FIG. 15 references a WLAN uplink ratio field, in some embodiments, a time window field may also be used with the PDU example depicted in FIGS. 5-11 based on a WLAN uplink amount requested by the eNB.

There are several options of how the eNB may indicate a time window to a UE. In some embodiments, the time window could be included in the same message which signals WLAN uplink data request or split ratio. For example, in FIG. 15, the time window field is sent in a PDU with the WLAN uplink ratio. In some embodiments, a separate PDU may be sent as part of its own PDU or as part of another control PDU sent by the eNB (e.g., over WLAN using LWAAP, over LTE link using MAC CE or PDCP Control PDU, or using RRC signaling). In some embodiments, time window may be determined by the UE and is not signaled by the eNB and the UE may determine on its own the time window to consider to prepare data for transmission on one or both of the links.

The table below describes possible time windows that may be indicated by a 2 bit time window field used in the example PDU depicted in FIG. 15. In some embodiments, a larger or smaller field may be used to provide fewer or additional indications of time windows. In addition, in some embodiments, the values of the time windows may be different than those shown in the table.

| Bit | Description |
|---|---|
| 00 | 10 ms |
| 01 | 50 ms |
| 10 | 100 ms |
| 11 | 500 ms |

FIGS. 16 and 17 depict additional examples of PDUs indicating a time window for the UE to consider when determining an amount of uplink data to transmit on a WLAN link. FIG. 16 includes a time window field with an LCG ID field to indicate the ratio of uplink data to send on a WLAN link for a specified LCG ID. FIG. 17 includes a time window field with a DRB ID field to indicate the ratio of uplink data to send on a WLAN link for a specified DRB ID.

For embodiments where the time window is configured by an eNB, in some embodiments, the change of the WLAN uplink ratio or WLAN UL amount may be done at the windows boundary only. For example, the UE may only consider a new time window when a previous time window has elapsed. In other embodiments, the change of WLAN uplink ratio or WLAN UL amount may be done at other time however the UE may start to take it into account from next window boundary only. In some embodiments, the UE may restart a time window when a new time window is indicated in a PDU from the eNB.

In an example, the UE may be using a time window of 10 ms that was indicated by an eNB and splitting ratio as 50% (i.e., 50% data goes to WLAN UL and 50% to LTE UL). The UE may compute an aggregated throughput and determine an amount of data to send to WLAN and LTE based on the time window. For instance, if the aggregated throughput is determined to be 800 Mbps (i.e., 100 Mbyte/s), the throughput may correspond to 1 Mbyte every 10 ms. Then the UE may send 500 kB each to WLAN and LTE within 10 ms window, repeating every 10 ms and reevaluating in case of change of split ratio as signaled from the network. Alternatively, UE may send first 500 kB to WLAN then second 500 kB to LTE and so on. Alternatively, UE may send first 500 kB to LTE then second 500 kB to WLAN and so on.

Another alternative to time window is to associate the splitting ratio to a block size where eNB can configure the granularity of the traffic split for a set amount of data. For instance, the eNB may configure a block size to be 100 kB and spit ratio of 80% WLAN 20% LTE. Then UE will send 80 kB to WLAN and 20 kB to LTE and repeat this pattern. In some embodiments, a UE may prepare data for transmission only for a time window configured by an eNB and may discontinue transmission on the WLAN link until a new time window indication is received from the eNB.

FIG. 18-21 depict example PDUs that may be transmitted by a UE to an eNB to indicate a buffer status of the UE. For example, the example PDUs shown in FIGS. 18-21 may be sent in operation 1 of the diagram illustrated in FIG. 4. In the situations where the eNB controls the uplink splitting based on a predefined ratio or uplink amount, it may be beneficial to have BSR information such that the eNB can differentiate the amount of data on LWA bearers vs non-LWA bearer. In some embodiments, the eNB may configure LWA bearers and non-LWA bearers on different LCGs. This option can enable the UE to report separate BSRs for LWA and non-LWA bearers without changing the BSR reporting compared to non LWA implementations. In an example, all LWA bearers may be assigned to one LCG, and non-LWA bearers may never be assigned to that LCG. In some embodiments, two different BSRs may be used by the UE, namely BSR for LWA bearers and BSR for non-LWA bearers. The BSR for LWA bearers may be applicable only for LWA bearers and an LTE BSR may be used for LTE traffic. The BSR may be sent in uplink data by using LWAAP wherein additional header field may be defined for BSR type identification. The example PDUs in FIGS. 18-21 depict example of BSRs for WLA bearer using LWAAP. In some embodiments, similar implementations may be used for BSR reporting using MAC CE or PDCP control PDU or the like.

Figure 18:
FIG. 18 illustrates an example protocol data unit used for signaling buffer size, according to an implementation.

FIG. 18 shows a BSR for LWA bearers for reporting one LCG (e.g., a "short BSR" or a "truncated BSR") where the LCG is identified by LCG ID field. FIG. 19 shows a BSR for LWA bearers for reporting all LCGs (e.g. a "long BSR") where the buffer size #0 corresponds to buffer size for LCG ID 0, buffer size #1 corresponds to buffer size for LCG ID 1 and so on.

In FIGS. 18 and 19 the PDU type may be used to identify the type of a BSR for LWA bearers. The length of PDU type field can be different. The buffer size field which is 6 bits as shown can represent the value of the data available in the buffer. In some embodiments, a different size field for buffer size specific to LWA and/or LWA-specific mapping tables can be defined. At the eNB, the LWAAP may be terminated at PDCP layer. Therefore, the PDCP layer may pass the buffer status information to lower layers upon reception or upon request from lower layers.

In some embodiments, the UE may transmit a BSR for LWA bearers on per bearer basis. FIGS. 20 and 21 depict example PDUs for reporting BSRs for specific DRB IDs. For example, the example PDU shown in FIG. 20 may be a short BSR or a truncated BSR indicating the buffer size for a particular DRB ID. The example PDU in FIG. 21 may be a long BSR indicating the buffer size for a number of buffers indicated by a number of BSRs field.

In the PDU format shown in FIG. 21, the number of BSRs field indicates the number of DRB specific BSRs included in the PDU. In this format, a number of padding bits may be included for byte-alignment. In one embodiment, the short DRB-specific LWA-BSR/truncated BSR and long per DRB LWA-BSR (i.e., formats shown in FIGS. 20 and 21) can be distinguished using different PDU types. In some embodiments, extension bits may be added to infer the number of BSRs included in the PDU instead of including number of BSRs field. For example, an extension field may be used in the same manner as described with reference to FIG. 11 above.

As described above, in addition to signaling the uplink amounts, uplink ratios, timing windows, and BSR information for LWA uplink data using LWAAP, the UE and the eNB may transmit such information using in-band signaling over LTE link using MAC CE or over LTE or WLAN using PDCP Control PDU. The PDUs described with reference to FIGS. 5-21 may be used over such links in the same manner as described with reference to the LWAAP links.

The following examples pertain to further implementations of the disclosure.

Example 1 is an apparatus of a base station, comprising: a memory device; and processing circuitry operatively coupled to the memory device, the processing circuitry to: process a buffer status report (BSR) indicating an amount of data in a buffer of a user equipment (UE); determine an amount of data to be transmitted on wireless local area network (WLAN) channel of the UE or a ratio of WLAN uplink data to be transmitted on the WLAN channel of the UE to long term evolution (LTE) uplink data to be transmitted on a LTE channel; and encode a protocol data unit (PDU) indicating the amount or the ratio, wherein the PDU is to be transmitted to the UE.

In example 2, in the apparatus of example 1, or any of the examples described herein, to indicate the ratio, the processing circuitry is to encode the PDU to comprise a request for a determined amount of uplink data to transmit over the WLAN channel.

In example 3, in the apparatus of example 1, or any of the examples described herein, to indicate the amount or the ratio, the processing circuitry is to encode the PDU to comprise a logical channel group (LCG) identifier for an LCG and a request for a determined amount of uplink data to transmit over the WLAN channel for the LCG.

In example 4, in the apparatus of example 1, or any of the examples described herein, to indicate the amount or the ratio, the processing circuitry is to encode the PDU to comprise a first data radio bearer (DRB) identifier for a first DRB and a request for a first determined amount of uplink data to transmit over the WLAN channel for the first DRB.

In example 5, in the apparatus of example 1, or any of the examples described herein, the PDU further comprises a second data radio bearer (DRB) identifier for a second DRB and a request for a second determined amount of uplink data to transmit over the WLAN channel for the second DRB.

In example 6, in the apparatus of example 1, or any of the examples described herein, to indicate the ratio, the processing circuitry encodes the PDU to specify a percentage of uplink data to transmit over the WLAN channel and a time period to maintain the percentage.

In example 7, in the apparatus of example 1, or any of the examples described herein, the processing circuitry is further to cause the PDU to be transmitted over the WLAN channel using LTE-WLAN aggregation (LWA) adaptation protocol (LWAAP).

In example 8, in the apparatus of example 1, or any of the examples described herein, the processing circuitry is further to cause the PDU to be transmitted over the WLAN channel as a packet data convergence protocol (PDCP) control PDU.

In example 9, in the apparatus of example 1, or any of the examples described herein, the processing circuitry is further to cause the PDU to be transmitted over the LTE channel as a media access control (MAC) control element.

In example 10, the apparatus of example 1, or any of the examples described herein further comprises: radio frequency circuitry coupled to the processing circuitry; and front-end circuitry coupled to the radio frequency circuitry, wherein the front-end circuitry is to transmit the PDU through one or more antennas coupled to the front-end circuitry.

Example 11 is an apparatus of a user equipment, comprising: a memory device; and processing circuitry operatively coupled to the memory device, the processing circuitry to: encode a buffer status report (BSR) to indicate a buffer size of a data radio bearer (DRB), or a logical channel identified by an LCID or a logical channel group (LCG) that uses LTE-WLAN aggregation (LWA); process a protocol data unit (PDU) that specifies an amount of uplink data to be transmitted over a WLAN channel or a ratio of uplink data to be transmitted over an LTE channel and the WLAN channel; and encode uplink data to be transmitted over the LTE channel and the WLAN channel according to the indication of the amount of uplink data to be transmitted over a WLAN channel or ratio of uplink data to be transmitted over the LTE channel and the WLAN channel.

In example 12, in the apparatus of example 11, or any of the examples described herein, the indication of the amount of WLAN uplink data comprises a WLAN uplink data request, and wherein to encode the uplink data to be transmitted over the LTE channel and the WLAN channel, the processing circuitry is to: encode an amount of WLAN uplink data requested in the WLAN uplink data request in the PDU; and in response to receiving an LTE UL grant, encode data not encoded as WLAN uplink data as LTE uplink data over the LTE channel.

In example 13, in the apparatus of example 11, or any of the examples described herein, the processing circuitry is further to: determine a first amount of WLAN uplink data to transmit based on the ratio and the amount of data to be transmitted over the LTE channel during a time interval, wherein the amount of data to be transmitted over the LTE channel is specified in an uplink grant; and encode the determined first amount of WLAN uplink during the time interval.

In example 14, in the apparatus of example 11, or any of the examples described herein, the processing circuitry is further to cause the BSR to be transmitted using LTE-WLAN aggregation (LWA) adaptation protocol (LWAAP) over the WLAN channel.

In example 15, in the apparatus of example 11, or any of the examples described herein, the processing circuitry is further to cause the BSR to be transmitted as a packet data convergence protocol (PDCP) control PDU over the WLAN channel or the LTE channel.

In example 16, in the apparatus of example 11, or any of the examples described herein, the processing circuitry is further to cause the PDU to be transmitted as a media access control (MAC) control element over the LTE channel.

In example 17, the apparatus of example 11, or any of the examples described herein, further comprises: radio frequency circuitry coupled to the processing circuitry; and front-end circuitry coupled to the radio frequency circuitry, wherein the front-end circuitry is to transmit the BSR through one or more antennas coupled to the front-end circuitry.

Example 18 is one or more computer-readable media having instructions that, when executed, cause processing circuitry of a base station to: process a buffer status report (BSR) indicating an amount of data in a buffer of a user equipment (UE); determine an amount of uplink data to be transmitted over a wireless local area network (WLAN) channel or a ratio of WLAN uplink data to be transmitted on the WLAN channel of the UE to long term evolution (LTE) uplink data to be transmitted on a LTE channel; and encode a protocol data unit (PDU) indicating the amount or the ratio, wherein the PDU is to be transmitted to the UE.

In example 19, the instructions of the computer-readable media of example 18, or any of the examples described herein, further cause the processing circuitry to encode the PDU to comprise a request for a determined amount of uplink data to transmit over the WLAN channel.

In example 20, in the computer-readable media of example 18, or any of the examples described herein, to indicate the ratio, the instructions further cause the processing circuitry to encode the PDU to comprise a logical channel group (LCG) identifier for an LCG and a request for a determined amount of uplink data to transmit over the WLAN channel for the LCG.

In example 21, in the computer-readable media of example 18, or any of the examples described herein, to indicate the ratio, the instructions further cause the processing circuitry to encode the PDU to comprise a first data radio bearer (DRB) identifier for a first DRB and a request for a first determined amount of uplink data to transmit over the WLAN channel for the first DRB.

In example 22, the instructions of the computer-readable media of example 21, or any of the examples described herein, further cause the processing circuitry to encode the PDU to further comprise a second data radio bearer (DRB) identifier for a second DRB and a request for a second determined amount of uplink data to transmit over the WLAN channel for the second DRB.

In example 23, in the computer-readable media of example 18, or any of the examples described herein, to indicate the ratio, the instructions further cause the processing circuitry to encode the PDU to specify a percentage of WLAN uplink data to transmit over the WLAN channel and an indication of a time period to maintain the percentage.

In example 24, the instructions of the computer-readable media of example 21, or any of the examples described herein, further cause the processing circuitry to cause the PDU to be transmitted over the WLAN channel using LTE-WLAN aggregation (LWA) adaptation protocol (LWAAP) or over the WLAN or LTE as a packet data convergence protocol (PDCP) control PDU.

In example 25, the instructions of the computer-readable media of example 21, or any of the examples described herein, further cause the processing circuitry to cause the PDU to be transmitted over the LTE channel as a media access control (MAC) control element.

Example 26 is a method comprising: processing, by processing circuitry, a buffer status report (BSR) indicating an amount of data in a buffer of a user equipment (UE); determining, by the processing circuitry, a ratio of WLAN uplink data to be transmitted on the WLAN channel of the UE to long term evolution (LTE) uplink data to be transmitted on a LTE channel; and encoding, by the processing circuitry, a protocol data unit (PDU) indicating the ratio, wherein the PDU is to be transmitted to the UE.

In example 27, in the method of example 26, or any of the examples described herein, encoding the PDU to indicate the ratio further comprises encoding the PDU to comprise a request for a determined amount of uplink data to transmit over the WLAN channel.

In example 28, in the method of example 26, or any of the examples described herein, encoding the PDU to indicate the ratio further comprises encoding the PDU to comprise a logical channel group (LCG) identifier for an LCG and a request for a determined amount of uplink data to transmit over the WLAN channel for the LCG.

In example 29, in the method of example 26, or any of the examples described herein, encoding the PDU to indicate the ratio further comprises encoding the PDU to comprise a first data radio bearer (DRB) identifier for a first DRB and a request for a first determined amount of uplink data to transmit over the WLAN channel for the first DRB.

In example 30, in the method of example 26, or any of the examples described herein encoding the PDU further comprises encoding the PDU to further comprise a second data radio bearer (DRB) identifier for a second DRB and a request for a second determined amount of uplink data to transmit over the WLAN channel for the second DRB.

In example 31, in the method of example 26, or any of the examples described herein encoding the PDU to indicate the ratio further comprises encoding the PDU to specify a percentage of WLAN uplink data to transmit over the WLAN channel and an indication of a time period to maintain the percentage.

In example 32, the method of example 26, or any of the examples described herein, further comprises causing the PDU to be transmitted over the WLAN channel using LTE-WLAN aggregation (LWA) adaptation protocol (LWAAP) or over the WLAN or LTE as a packet data convergence protocol (PDCP) control PDU.

In example 33, the method of example 26, or any of the examples described herein, further comprises causing the PDU to be transmitted over the LTE channel as a media access control (MAC) control element.

In the description herein, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present disclosure. It will be apparent, however, that these specific details need not be employed to practice the present disclosure. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system have not been described in detail in order to avoid unnecessarily obscuring the present disclosure.

Instructions used to program logic to perform implementations of the disclosure can be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one implementation, refers to the hardware, which is specifically configured to recognize and/or execute the code to be held on a non-transitory medium. Furthermore, in another implementation, use of a module refers to the non-transitory medium including the code, which is specifically adapted to be executed by the microcontroller to perform predetermined operations. And as can be inferred, in yet another implementation, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one implementation, use of the term logic includes hardware, such as transistors, registers, or other hardware, such as programmable logic devices.

Use of the phrase 'configured to,' in one implementation, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focuses on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one implementation, refers to some apparatus, logic, hardware, and/or element designed in such a way to enable use of the apparatus, logic, hardware, and/or element in a specified manner. Note as above that use of to, capable to, or operable to, in one implementation, refers to the latent state of an apparatus, logic, hardware, and/or element, where the apparatus, logic, hardware, and/or element is not operating but is designed in such a manner to enable use of an apparatus in a specified manner.

The implementations of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform implementations of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer)

Reference throughout this specification to "one implementation" or "an implementation" means that a particular feature, structure, or characteristic described in connection with the implementation is included in at least one implementation of the present disclosure. Thus, the appearances of the phrases "in one implementation" or "in an implementation" on "in some implementations" in various places throughout this specification are not necessarily all referring to the same implementation. Furthermore, the particular features, structures, or characteristics may be combined in any suitable manner in one or more implementations.

In the foregoing specification, a detailed description has been given with reference to specific exemplary implementations. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of implementation and other exemplarily language does not necessarily refer to the same implementation or the same example, but may refer to different and distinct implementations, as well as potentially the same implementation.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. The blocks described herein can be hardware, software, firmware or a combination thereof.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "selecting," "receiving," "determining," "generating," "measuring," "calculating," "setting," "identifying," "executing," "transmitting," "communicating," "accessing," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" or "an implementation" or "one implementation" throughout is not intended to mean the same implementation or implementation unless described as such. Also, the terms "first," "second," "third," "fourth," etc. as used herein are meant as labels to distinguish among different elements and may not necessarily have an ordinal meaning according to their numerical designation.

What is claimed is:

1. An apparatus of a base station, comprising:
 a memory device; and
 processing circuitry operatively coupled to the memory device, the processing circuitry to:
  process a buffer status report (BSR) indicating an amount of data in a buffer of a user equipment (UE);
  determine a ratio of wireless local area network (WLAN) uplink data to be transmitted on a WLAN channel of the UE to long term evolution (LTE) uplink data to be transmitted on an LTE channel, wherein the ratio is determined using an estimated throughput based at least in part on a received signal strength indicator (RSSI); and
  encode a protocol data unit (PDU) comprising a first field indicating the ratio and a second field indicating a time window during which the ratio should be maintained by the UE; and
  transmit the PDU to the UE.

2. The apparatus of claim 1, wherein to indicate the ratio, the processing circuitry is to encode the PDU to comprise a request for a determined amount of uplink data to transmit over the WLAN channel.

3. The apparatus of claim 1, wherein to indicate the ratio, the processing circuitry is to encode the PDU to comprise a logical channel group (LCG) identifier for an LCG and a request for a determined amount of uplink data to transmit over the WLAN channel for the LCG.

4. The apparatus of claim 1, wherein to indicate the ratio, the processing circuitry is to encode the PDU to comprise a first data radio bearer (DRB) identifier for a first DRB and a request for a first determined amount of uplink data to transmit over the WLAN channel for the first DRB.

5. The apparatus of claim 4, wherein the PDU further comprises a second data radio bearer (DRB) identifier for a second DRB and a request for a second determined amount of uplink data to transmit over the WLAN channel for the second DRB.

6. The apparatus of claim 1, wherein to indicate the ratio, the processing circuitry is to encode the PDU to specify a percentage of uplink data to transmit over the WLAN channel and the time window to maintain the percentage.

7. The apparatus of claim 1, wherein the processing circuitry is further to cause the PDU to be transmitted over the WLAN channel using LTE-WLAN aggregation (LWA) adaptation protocol (LWAAP).

8. The apparatus of claim 1, wherein the processing circuitry is further to cause the PDU to be transmitted over the WLAN channel as a packet data convergence protocol (PDCP) control PDU.

9. The apparatus of claim 1, wherein the processing circuitry is further to cause the PDU to be transmitted over the LTE channel as a media access control (MAC) control element.

10. The apparatus of claim 1, further comprising:
 radio frequency circuitry coupled to the processing circuitry; and
 front-end circuitry coupled to the radio frequency circuitry, wherein the front-end circuitry is to transmit the PDU through one or more antennas coupled to the front-end circuitry.

11. An apparatus of a user equipment, comprising:
 a memory device; and
 processing circuitry operatively coupled to the memory device, the processing circuitry to:
  encode a buffer status report (BSR) to indicate a buffer size of a data radio bearer (DRB), or a logical channel identified by an LCD or a logical channel group (LCG) that uses LTE-WLAN aggregation (LWA);
  process a protocol data unit (PDU) comprising a first field that specifies an amount of uplink data to be transmitted over a WLAN channel, and a second field that specifies a time window during which a ratio should be maintained by the UE, wherein the ratio is determined using an estimated throughput based at least in part on a received signal strength indicator (RSSI); and encode uplink data to be transmitted over an LTE channel and the WLAN channel according to the first field that specifies the amount of uplink data to be transmitted over the WLAN channel and the second field that specifies the time window.

12. The apparatus of claim 11, wherein the first field that specifies the amount of uplink data to be transmitted over the WLAN channel comprises a WLAN uplink data request, and wherein to encode the uplink data to be transmitted over the LTE channel and the WLAN channel, the processing circuitry is to:
encode an amount of WLAN uplink data requested in the WLAN uplink data request in the PDU; and
in response to receiving an LTE UL grant, encode data not encoded as WLAN uplink data as LTE uplink data over the LTE channel.

13. The apparatus of claim 11, wherein the processing circuitry is further to:
determine a first amount of WLAN uplink data to transmit based on the ratio and an amount of data to be transmitted over the LTE channel during a time interval, wherein the amount of data to be transmitted over the LTE channel is specified in an uplink grant; and
encode the first amount of WLAN uplink during the time interval.

14. The apparatus of claim 11, wherein the processing circuitry is further to cause the BSR to be transmitted using LTE-WLAN aggregation (LWA) adaptation protocol (LWAAP) over the WLAN channel.

15. The apparatus of claim 11, wherein the processing circuitry is further to cause the BSR to be transmitted as a packet data convergence protocol (PDCP) control PDU over the WLAN channel or the LTE channel.

16. The apparatus of claim 11, wherein the processing circuitry is further to cause the PDU to be transmitted as a media access control (MAC) control element over the LTE channel.

17. The apparatus of claim 11, further comprising:
radio frequency circuitry coupled to the processing circuitry; and
front-end circuitry coupled to the radio frequency circuitry, wherein the front-end circuitry is to transmit the BSR through one or more antennas coupled to the front-end circuitry.

18. One or more non-transitory computer-readable media having instructions that, when executed, cause processing circuitry of a base station to:
process a buffer status report (BSR) indicating an amount of data in a buffer of a user equipment (UE);
determine a ratio of WLAN uplink data to be transmitted on the WLAN channel of the UE to long term evolution (LTE) uplink data to be transmitted on an LTE channel wherein the ratio is determined using an estimated throughput based at least in part on a received signal strength indicator (RSSI); and
encode a protocol data unit (PDU) comprising a first field indicating the ratio and a second field indicating a time window during which the ratio should be maintained by the UE; and
transmit the PDU to the UE.

19. The one or more non-transitory computer-readable media of claim 18, wherein to indicate the ratio, the instructions further cause the processing circuitry to encode the PDU to comprise a request for a determined amount of uplink data to transmit over the WLAN channel.

20. The one or more non-transitory computer-readable media of claim 18, wherein to indicate the ratio, the instructions further cause the processing circuitry to encode the PDU to comprise a logical channel group (LCG) identifier for an LCG and a request for a determined amount of uplink data to transmit over the WLAN channel for the LCG.

* * * * *